(12) United States Patent
Ingvast et al.

(10) Patent No.: US 8,029,414 B2
(45) Date of Patent: Oct. 4, 2011

(54) STRENGTHENING GLOVE

(75) Inventors: Johan Ingvast, Åkersberga (SE); Hans Von Holst, Djursholm (SE); Jan Wikander, Vaxholm (SE)

(73) Assignee: Bioservo Technologies AB, Stockholm (SE)

( * ) Notice: Subject to any disclaimer, the term of this patent is extended or adjusted under 35 U.S.C. 154(b) by 125 days.

(21) Appl. No.: 12/439,522

(22) PCT Filed: Aug. 30, 2007

(86) PCT No.: PCT/SE2007/050593
§ 371 (c)(1),
(2), (4) Date: Feb. 28, 2009

(87) PCT Pub. No.: WO2008/027002
PCT Pub. Date: Mar. 6, 2008

(65) Prior Publication Data
US 2010/0041521 A1   Feb. 18, 2010

(30) Foreign Application Priority Data

Sep. 1, 2006  (SE) ..................... 0601792
Sep. 1, 2006  (SE) ..................... 0601793

(51) Int. Cl.
*A63B 23/16* (2006.01)
*A63B 24/00* (2006.01)
*A61H 1/02* (2006.01)
*A61F 5/00* (2006.01)

(52) U.S. Cl. ............... 482/47; 482/4; 601/40; 602/22

(58) Field of Classification Search ............... 482/44–48, 482/4, 139; 601/5, 33, 40; 602/20–22; 2/161.1, 2/163
See application file for complete search history.

(56) References Cited

U.S. PATENT DOCUMENTS 2,893,016 A   1/1956 Zion
(Continued)

FOREIGN PATENT DOCUMENTS

| DE | 2639143 A1 | 3/1977 |
| NL | 7014761 A | 4/1971 |
| WO | WO 2004021936 A1 | 3/2004 |

OTHER PUBLICATIONS

International Search Report, dated Oct. 30, 2007, issued in connection with counterpart International Application No. PCT/SE2007/050593.

(Continued)

*Primary Examiner* — Allana Lewin
(74) *Attorney, Agent, or Firm* — Venable LLP; Eric J. Franklin

(57) ABSTRACT

A finger glove for use in gripping movements with one or more fingers of a human hand enclosed in the glove. The glove includes glove fingers and a palm. At least one glove finger is adapted to include on each side an artificial tendon that extends along an inside of the glove. A yoke is fitted in a tip of the at least one glove finger and intended to surround a tip of an enclosed finger. At each side of the glove finger artificial tendons are connected to the yoke. A system including the finger glove having a force detecting sensor is situated on the inside of the at least one glove finger and is adapted to detect a force between a finger enclosed in the glove finger and a contact surface applied to the finger. The artificial tendons for a glove finger are connected to at least one actuator and a control unit adapted to cause the at least one actuator to exert a pulling force on the artificial tendons of the glove finger based on a force detected in the force detecting sensor, whereby the finger enclosed in the glove finger is caused to bend.

10 Claims, 3 Drawing Sheets

U.S. PATENT DOCUMENTS

| | | | | |
|---|---|---|---|---|
| 3,944,220 A * | 3/1976 | Fasano | | 482/47 |
| 4,084,267 A | 4/1978 | Zadina | | |
| 4,542,291 A * | 9/1985 | Zimmerman | | 250/231.1 |
| 4,830,360 A * | 5/1989 | Carr, Jr. | | 482/47 |
| 4,881,275 A * | 11/1989 | Cazares et al. | | 2/161.1 |
| 5,527,244 A * | 6/1996 | Waller et al. | | 482/47 |
| 5,538,488 A * | 7/1996 | Villepigue | | 482/47 |
| 5,697,103 A * | 12/1997 | Wiggins | | 2/159 |
| 5,820,577 A * | 10/1998 | Taylor | | 601/40 |
| 5,865,770 A * | 2/1999 | Schectman | | 601/23 |
| 7,415,735 B2 * | 8/2008 | Erickson et al. | | 2/163 |
| 7,731,633 B1 * | 6/2010 | Williams | | 482/47 |
| 2003/0195093 A1 * | 10/2003 | White | | 482/124 |
| 2006/0094989 A1 | 5/2006 | Scott et al. | | |

OTHER PUBLICATIONS

Written Opinion of the International Searching Authority, dated Oct. 30, 2007, issued in connection with counterpart International Application No. PCT/SE2007/050593.

Brown, et al., "The Exoskeleton Glove for Control of Paralyzed Hands," IEEE, pp. 642-647 (1993).

Shields, et al., "An Anthropomorphic Hand Exoskeleton to Prevent Astronaut Hand Fatigue During Extravehicular Activities," *IEEE Transactions on Systems, Man, and Cybernetics, Part A: Systems and Humans*, vol. 27, No. 5, pp. 668-673; Sep. 1997.

International Search Report, dated Oct. 30, 2007, issued in connection with counterpart International Application No. PCT/SE2007/050593.

Written Opinion of the International Searching Authority, dated Oct. 30, 2007, issued in connection with counterpart International Application No. PCT/SE2007/050593.

Brown, et al., "The Exoskeleton Glove for Control of Paralyzed Hands," IEEE, pp. 642-647 (1993).

Shields, et al., "An Anthropomorphic Hand Exoskeleton to Prevent Astronaut Hand Fatigue During Extravehicular Activities," IEEE Transactions on Systems, Man, and Cybernetics, Part A: Systems and Humans, vol. 27, No. 5, pp. 668-673; Sep. 1997.

* cited by examiner

STRENGTHENING GLOVE

CROSS-REFERENCE TO RELATED APPLICATIONS

This application claims priority to Swedish patent application 0601792-5 filed 1 Sep. 2006 and Swedish patent application 0601793-3 filed 1 Sep. 2006 is the national phase under 35 U.S.C. § 371 of PCT/SE2007/050593 filed 30 Aug. 2007.

TECHNICAL FIELD

The present invention relates to a glove intended to be worn by a human hand and be used for strengthening a gripping movement executed by one or more fingers of the hand.

STATE OF THE ART

A human with normal functions finds it quite natural to be able to grip an object with the hand and hold the object by desired and appropriate force between the fingers and the object for as long a time as desired. Where a person's gripping movement with a hand does not have sufficient force, such a gripping movement may be found to be impossible or almost impossible to execute. Examples of cases where muscular strength is not sufficient for such gripping movements include elderly persons with muscle weakening and persons being rehabilitated after, for example, brain injury. The same problem may also affect persons who have certain types of chronic conditions, e.g. rheumatism. Other examples of situations where it may be advantageous or necessary for persons to increase the muscular force which the hand can apply to an object in a gripping movement include, for example, astronauts or manual workers in certain situations.

Quite little has been done historically to use technical aids for strengthening the muscular force of persons who cannot manage to execute the aforesaid hand grip. An example of a closely allied situation is where a person completely lacks a hand. In that case there are plenty of different mechanical solutions in the form of prostheses that can perform gripping movements in a variety of ways.

U.S. Pat. No. 4,084,267 refers to an example of a drive device for an orthosis, i.e. an external aid for imparting equivalents of muscular forces to the fingers of a human hand. That specification refers to cables which are pulled on the upper and/or inner sides of the fingers.

An article entitled "The Exoskeleton Glove for Control of Paralyzed Hands"; P. Brown, D. Jones, S. K. Singh; 1993 IEEE, pages 642-647 concerns a proposal for an external skeleton for a glove for a paralysed hand. That external skeleton is constructed mechanically and forms a kind of load-bearing skeleton round the hand.

Another article, entitled "An Anthropomorphic Hand Exoskeleton to Prevent Astronaut Hand Fatigue during Extra-vehicular Activities"; B. L. Shields, J. A. Main, S. W. Peterson, A. M. Strauss; 1997 IEEE, pages 668-673 describes a device, likewise an example of a mechanical external skeleton for a hand, specifically intended to increase the power of muscular movements during work involving the fingers in circumstances where their muscles soon tire.

The two articles cited refer to examples of mechanical skeletons made up of loadbearing units, which always renders the skeletons clumsy and unusable for the kinds of need described above.

A further reference to prior art is made by citing document US2008/0094989. In this specification an example is disclosed, wherein fingers are actuated by cords running in sheaths along the finger. One cord for each finger is proposed for each finger joint in order to extend the finger and one cord along the inside of the finger to flex it. It is designed to control individual joints, thereby requiring one actuator for extending each joint and one for flexing it. Hence many actuators are needed when a number of fingers are actuated. The purpose is to apply motions to the joints not to apply forces to the grip performed by the fingers.

Another reference is made to document NL 7014761, wherein a method for actuation of the finger joints of a prosthesis, or a hand, is proposed. Only the closing of the fingers are actuated, while opening of the hand is made by springs. Each finger is actuated by one cord running on the inside of the finger. Only one actuator is therefore necessary for putting torque to all three joints of the finger. Such a configuration of a device when the number of joints is larger than the number of actuators is called under-actuation. A disadvantage of the design proposed in NL7014761, if applied to a human hand, is that the distance between the joints of the finger and the cord is more or less fixed to the distance from the joint to the skin on the inside of the finger. For under-actuation to perform well the orthogonal distance between the cord and the joint should increase with the distance from the fingertip. For example, if the finger is to apply forces only at the fingertip, then the orthogonal distance should increase linearly and if the forces should be evenly distributed over the finger length, the orthogonal distance should increase by the square of the distance from the fingertip.

An object of the present invention is to propose a solution to the disadvantages of the state of the art.

DESCRIPTION OF THE INVENTION

According to an aspect of the invention a device is presented.

Further embodiments of the invention are indicated in the dependent claims.

Said aspect of the invention refers to a glove provided with fingers, hereinafter called a finger glove, which in one aspect of the invention forms a part of a system used to strengthen muscular forces initiated in a gripping movement using the fingers of a human hand wearing the strengthening glove. The glove uses the fingers of the hand wearing it to balance the pushing forces which occur along a finger from the forces in the artificial tendons which are adapted to effecting the desired strengthening.

The finger glove is provided internally or in an intermediate layer with cords made of a suitable material which are intended to serve as said artificial tendons, expression "tendon" being hereinafter used for these cords.

EMBODIMENTS

A number of embodiments of the invention are described below with reference to the attached drawings.

Figure 1:
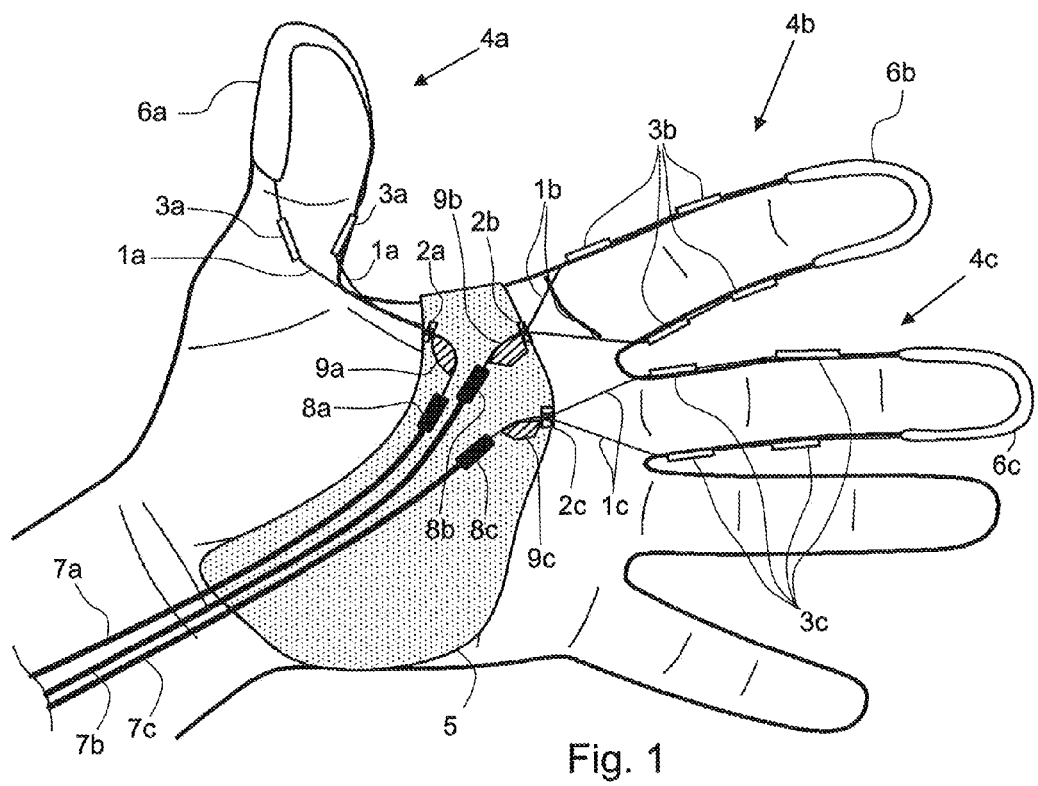
FIG. 1 depicts the finger glove according to an embodiment of the invention in a plan view looking towards the palm of a hand enclosed in the glove but with all the constituent material of the glove omitted for the sake of clarity.

The strengthening glove according to the invention is most simply illustrated in FIG. 1, where the finger glove is worn by a human hand but the actual glove to which the mechanical components are fitted is omitted to render the diagram more self-explanatory. The actual glove and its design are therefore not illustrated in the diagram, since the finger glove's design may of course vary in countless ways. For example, an already available glove, e.g. a sports glove, a golf glove or some type of anatomical glove, may be used, but a special glove is preferably made specifically for the purpose to suit the particular requirements of the finger glove user or a patient.

As previously mentioned, the finger glove is, in one embodiment of the invention, a component of a system here referred to as a strengthening glove. This strengthening glove comprises not only the finger glove but also:

- a force detecting sensor for each assistable glove finger,
- an actuator to impart a pulling force to the artificial tendons so that designated fingers of the glove bend inwards towards the palm of the hand and can thus execute a gripping movement,
- a feedback loop comprising an electronic circuit with a transmission function which causes a motor in the actuator to impart a pulling force to the artificial tendons in response to signals from a sensor and to parameters set in the transmission function.

The expression "glove finger" hereinafter means a finger of the glove which is intended to accommodate a finger of the hand which wears the glove. It thus means a glove finger equipped to strengthen the muscular force of said finger, and the characteristics of said glove finger apply to all the glove fingers covered by said strengthening. It may thus happen, for example, that only three glove fingers are equipped as described, but four or five fingers may be configured similarly.

FIG. 1 depicts the cords which serve as artificial tendons with reference notations 1a to 1c. For the sake of clarity, the diagram shows only three of the glove's fingers equipped with artificial tendons, viz. the glove fingers corresponding to the thumb, index finger and middle finger of a hand, it is of course possible for all of the fingers to be provided with corresponding devices as herein described for strengthening of muscular forces during finger movements, in which case all of the components involved in the system might, instead of referring to the three fingers referenced a-c in the present text, equally well comprise corresponding components referenced a-e if all five fingers are equipped with strengthening according to the aspect of the invention. The artificial tendons 1a-1c run through guides 2a, 2b, 2c and ducts 3a, 3b, 3c which are all fastened in the glove. The purpose of a guide is to direct and link, in a low friction way, a tendon of a specific finger from its extension across the palm of the hand into a proper fine along said specific finger. The guide 2a, 2b, 2c can include any member from: a sleeve, a guide roller, a guide pin, a ring, an eye. As illustrated in the diagram, a guide 2a, 2b, 2c is provided for each of the respective glove fingers, whereby two tendons 1a-1c, intended to bend a particular glove finger, are adapted to passing through the same guide 2a, 2b, 2c to the particular glove finger, the guide 2a, 2b, 2c being situated close to the base of that glove finger. Thus, for example, the guide 2b is situated close to the base of the glove finger 4b which corresponds to the index finger of the human hand. The artificial tendons 1b dedicated to acting upon the glove's index finger 4b run through said guide 2b and on along this glove finger through the ducts 3b. The ducts 3a, 3b, 3c are situated at the sides of the respective glove fingers and preferably close to the inner sides of the glove fingers. Accordingly, the artificial tendons 1a-1c will run along the sides of the glove fingers and, as mentioned, close to their inner sides.

The artificial tendons 1a-1c comprise pairs of tendons each on their respective side of a glove finger with a view to achieving lateral equilibrium of moments when a pulling force is applied to the tendons pertaining to a particular finger of the glove. The ducts and the guides are also so disposed that the tendons run at a certain perpendicular distance from the joint axes of a finger in order to apply a suitable bending moment to the finger. Said distance is greater close to the palm of the hand than further out from the palm. It should also be noted here that the glove fingers 4a-4c could be equipped with cords corresponding to artificial tendons which straighten the glove fingers after a gripping movement that has involved glove fingers. However, during a human hand's gripping movement, i.e. when a gripping movement about an object has been effected and completed, no specific hand muscles are usually involved in causing the fingers to revert to a straight position.

For good structural stability, the guides 2 are fastened to a rigid support 5 which covers a large proportion of the glove's equivalent to the palm of a hand. The design of the palm support 5 may vary, partly depending on which fingers of a hand for which the glove is intended are to be provided with strengthening, and it is of course possible for the support to be designed individually, i.e. adapted to the person who is to use the glove. The support is intended to serve as a substrate for fixing the guides 2a-2c so that they can guide the artificial tendons, i.e. hold said tendons close to the surface of the hand and ensure that two tendons for each finger are guided to leaving the palm of the hand at a point close to the base of the respective finger.

The palm support 5 is also a force opposing component for forces imparted via the artificial tendons 1a-1c. The artificial tendons 1a-1c are surrounded by wire sheaths 7a-7c terminated by end sleeves 8a-8c. The respective end sleeves 8a-8c are fixed to the palm support 5 in order to transmit force from corresponding tendons 1a-1c to the palm support 5 when a pulling force acts upon said corresponding tendons, i.e. the palm support 5 counteracts forces from the tendons.

Mountings 9a-9c may also with advantage be attached to the palm support 5. The purpose of these mountings 9a-9c is to guide the tendons 1a-1c between the end sleeves 8a-8c and the guides 2a-2b in order to provide the tendons with a predetermined curvature in this region, thereby preventing the tendons from assuming an unsuitable path or buckling to excessively sharp angles.

The palm support 5 need not be a separate unit if the corresponding region of the glove is made rigid so that the palm support can be integrated with the glove.

To further ensure that it abuts close to the palm of the hand, the support 5 may preferably be so configured that it has an extension which wraps round the hand, i.e. so that between the thumb and the index finger it is wrapped around the metacarpus and reaches a suitable distance onto the back of the hand between the thumb and the index finger. Further guides for guiding the artificial tendons may be attached along the palm support 5. The palm support 5 is also with advantage made of rigid plastic and may also comprise open areas.

The glove according to the aspect of the invention has, in a glove finger 4a-4c provided with strengthening, a yoke 6a-6c disposed at the tip of the glove finger to surround a tip of the enclosed finger or abut the tip of the finger. The purpose of the yoke is to ensure that when the artificial tendons 1a-1c are connected to said yoke 6a-6c the result is equivalent to the fastening of natural tendons to the outermost fingerbone. The yoke is therefore intended to serve the purpose that when the artificial tendons, e.g. the tendons 1b, puff on the yoke 6b, the enclosed fingertip will cause the finger 4b to bend, in this case the index finger. The fact that the artificial tendons also run through ducts 3a-3c at the side of the fingers and close to the inner sides of the fingers causes the finger in the glove to effect a gripping movement which resembles the natural finger's pattern of movement.

The yoke 6 may be configured in various different ways. Thus it may take the form of a bonnet which covers the actual fingertip of an enclosed finger, with fastenings attaching the artificial tendons 1a-1c to the sides of the bonnet. The yoke 6 may also, according to the preferred embodiment, be formed as a socket surrounding the fingertip on the upper side and on the sides or, alternatively on the upper side and every side round the fingertip. In an embodiment in the form of a socket, the yoke has well-situated fastening points at the sides of the socket furthest in towards the hand and close to the inner side of the finger As variants of these embodiments, the yoke may, in the simplest case, take the form of the actual cord which constitutes the artificial tendon 1a-1c, where the latter runs round the actual fingertip and is comparable to a yoke, thus rendering fastening points superfluous, in such an embodiment, the artificial tendon may be flattened at the end of the tip of the finger. According to different configurations the tendons may be fixed in relation to its corresponding yoke or the tendons may be slidingly connected to its corresponding yoke, whereby the tendon may run across the yoke in a sliding movement in relation to the yoke.

Where the yoke 6 takes the form of a bonnet or socket, it is preferably made of plastic material, but some other material such as metal or a composite is certainly usable. The constituent material of the yoke 6 may also take the form of a) continuous covering material, b) perforated material, c) mesh material, d) material according to any of a) to c) but comprising open areas. It is also advantageous that the material of the yoke be reinforced, e.g. by metal wires, glass fibres or equivalent, particularly round the portions of the material which are intended to serve as fastening points. In this embodiment it is possible for the yoke to be made by moulding to fit a specific user.

Different portions of the glove are made of different types of material. Most portions are made of flexible material to provide good comfort for an enclosed hand. Other portions, e.g. parts of the upper side of the glove fingers, are made of material which is rigid in at least one direction (perpendicular to the longitudinal direction of the finger). Further portions of the glove where rigidity of material may be required are round the palm support 5. The material is preferably permeable to moisture, so that a wearer of the glove can wear it for long periods of time without problems. Parts in the form of artificial tendons 1a-1c, guides 2a-2c, ducts 3a-3c, the palm support 5 and the yoke 6 may all be situated on the inside surface of the glove. Of these components, at least the palm support 5, the ducts 3a-3c and the yoke 6 are in that case fixed to said inside surface of the glove. In an alternative embodiment, the glove comprises at least one outer layer and one inner layer, in which case all or at least some of the components listed in this paragraph are placed between said inner and outer layers.

The material constituting the glove comprises in whole or in part a) continuous covering material, b) perforated material, c) mesh material, d) material according to any of a) to c) but comprising open areas.

The ducts 3a-3c fixed along the sides of the glove fingers take with advantage the form of tubes, channels or grooves fixed along the glove fingers. The principle is that the artificial tendons 1a-1c are guided along the glove fingers. Alternatively, sewn ducts being integrated with the glove itself may be used, it is necessary that the artificial tendons 1a-1c be provided with the possibility of bending, at least between said ducts, and that the length of the artificial tendons along the glove finger can be shortened and lengthened. The ducts could be continuous and made of a flexible material or if stiff tubes, channels, grooves or the like are used, the ducts must be interrupted at least at the joints of the finger. Where tubes or the like are used, the material is with advantage characterised by low friction, e.g. PTFE.

The artificial tendons 1a-1c are with advantage made of a low-friction easily bendable material, e.g any of the following materials: nylon, steel, Dynema, lined Kevlar.

Figure 4:
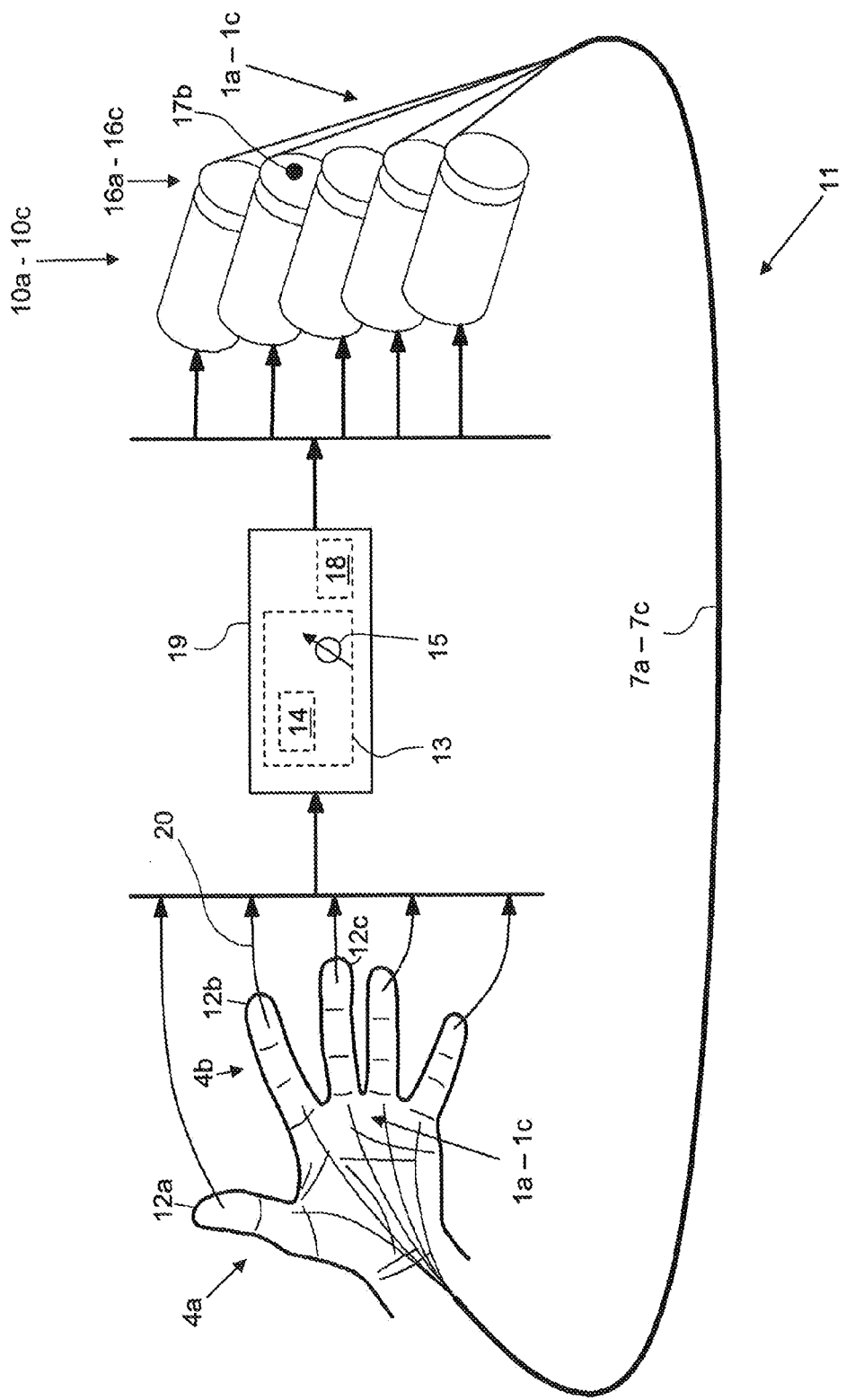
FIG. 4 depicts schematically a feedback loop with an actuator for the glove used for strengthening a gripping movement with any of the fingers of a hand.

The execution of a gripping movement with a finger inserted in a glove finger is described below with reference to FIG. 4, which illustrates a feedback loop 11 with five fingers equipped with strengthening, despite the fact that functioning with only three activated fingers is described in the above text. In the example depicted, the sensors from all five glove fingers are connected in the feedback loop.

The cords constituting the artificial tendons 1a-1c lead to an actuator 10a-10c for each pair of tendons, e.g. an actuator 10b for a gripping movement with the index finger. The actuators 10a-10c for the respective fingers are connected to and controlled via a feedback loop 11.

A force detecting sensor 12a-12c is situated on the inside of the glove finger 4a-4c. Said sensor 12a-12c measures the whole force or parts of the force occurring between the finger and an object which is gripped by the finger enclosed in the glove.

The force detecting sensor 12a-12c forms part of the feedback loop 11, which also comprises an electronic circuit 13 itself comprising a processor 14 programmed with a transmission function. The force measured by the sensor 12a-12c for a certain finger, e.g. 12b for the index finger, is scaled and converted to a reference force for said finger's actuator 10b. The force with which the actuator 10b then causes said finger to bend inwards as a result of being caused by the processor 14 to act upon the artificial tendons, in this case the tendons 1b, by applying a pulling force, results in increased force on the sensor 12b, so-called positive feedback. An appropriate scale factor results in strengthening. The scale factor may be varied by means of a variator 15, e.g. a potentiometer, connected to the electronic circuit 13. The feedback described may for example be effected by means of a microcontrol unit. Feedback as above is an example of known technology and is not further described here. It should also be mentioned that the number of force detecting sensors per glove finger may be one or more along the inside of the glove finger. The expression "a sensor" may therefore be interpreted as meaning that the sensor may comprise a plurality of units, it should further be mentioned that the force measured by a sensor is the whole or part of the force, which a finger applies to a contact surface which may be an object which is to be gripped by the hand, but the contact surface may as well be the inside of a yoke, which has a wall (such as a socket wall) such that the sensor 12a-12c is situated between this wall and the finger.

Where the yoke 6a-6b takes the form of a socket surrounding a finger on every side, the feedback loop may be configured in an alternative way, whereby the force sensor 12a-12c detects, as previously mentioned, the force which the glove wearer's finger actively exerts upon the yoke, but none of the force which the actuator 10b exerts on the yoke. After filtering and scaling, this detected force can then be used as the actuator's reference force. The problems which may arise in positive feedback are in this case thus avoided.

The performance (exactness of response) of the glove can be improved by introducing an inner control loop for each tendon. This control loop would use tension measurement of the artificial tendon to improve the exactness of the applied force. The tensions can be measured at the actuator (and be an inherent part of the actuator) but rather as close as possible to the yoke in order to reduce the error in tension because of friction. One possible alternative of measuring is inside the palm support, another is in the yoke.

According to an embodiment, an actuator $10a$-$10c$ may be connected to the artificial tendons $1a$-$1c$, which are connected to more than one glove finger $4a$-$4c$. According to another embodiment, a plurality of actuators may be connected to the artificial tendons of one and the same glove finger, thereby making it possible to refine the control of the glove finger.

A control unit 19 may be adapted to causing the actuators $10a$-$10c$ to exert a pulling force on the artificial tendons $1a$-$1c$ of only one glove finger $4a$-$4c$, e.g. the control unit may cause an actuator to bend, for example, an index finger inserted in the glove's equivalent of an index finger. The control unit may also be adapted to causing an actuator to bend more than one glove finger containing fingers.

According to an alternative embodiment, an actuator $10a$-$10c$ is connected by artificial tendons $1a$-$1c$ to only one glove finger $4a$-$4c$.

According to a further embodiment, the control unit 19 is adapted to causing an actuator $10a$-$10c$ to exert a pulling force on only the artificial tendons $1a$-$1c$ connected to the glove finger $4a$-$4c$ on the inside of which the force detecting sensor $12a$-$12c$ which detects said force is situated.

The actuators may take the form of an electric motor with a gear connected to a winding device, which may for example be a cord reel $16a$-$16c$ on which the artificial tendon is wound. The electric motor may, as well, be connected to a linear device known in the art, such as a bail screw. According to an example, a sensor $17b$ situated in the actuator $10b$ detects the pulling force in the artificial tendons $1b$ connected to the respective finger. This detected force is used for closing the internal feedback loop, which is guided towards a defined set-point, i.e. controlled by the defined scale factor. FIG. 4 depicts five actuators. This should not be interpreted as meaning that the respective actuators are connected by the artificial tendons $1a$-$1c$ to corresponding glove fingers $4a$-$4c$. The connection of actuators to glove fingers may be effected in various alternative ways, as mentioned above.

Figure 2:
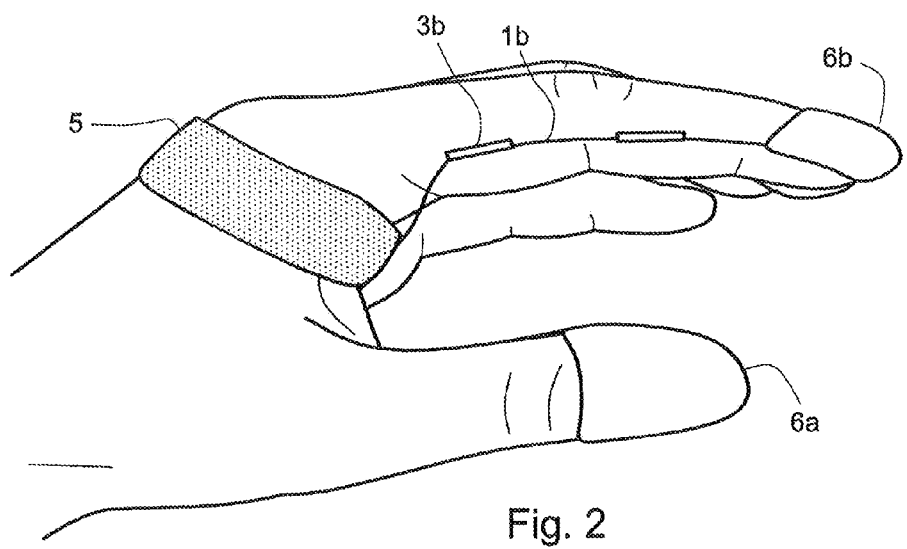
FIG. 2 shows the same as FIG. 1 but as seen from the side of the hand.
Figure 3:
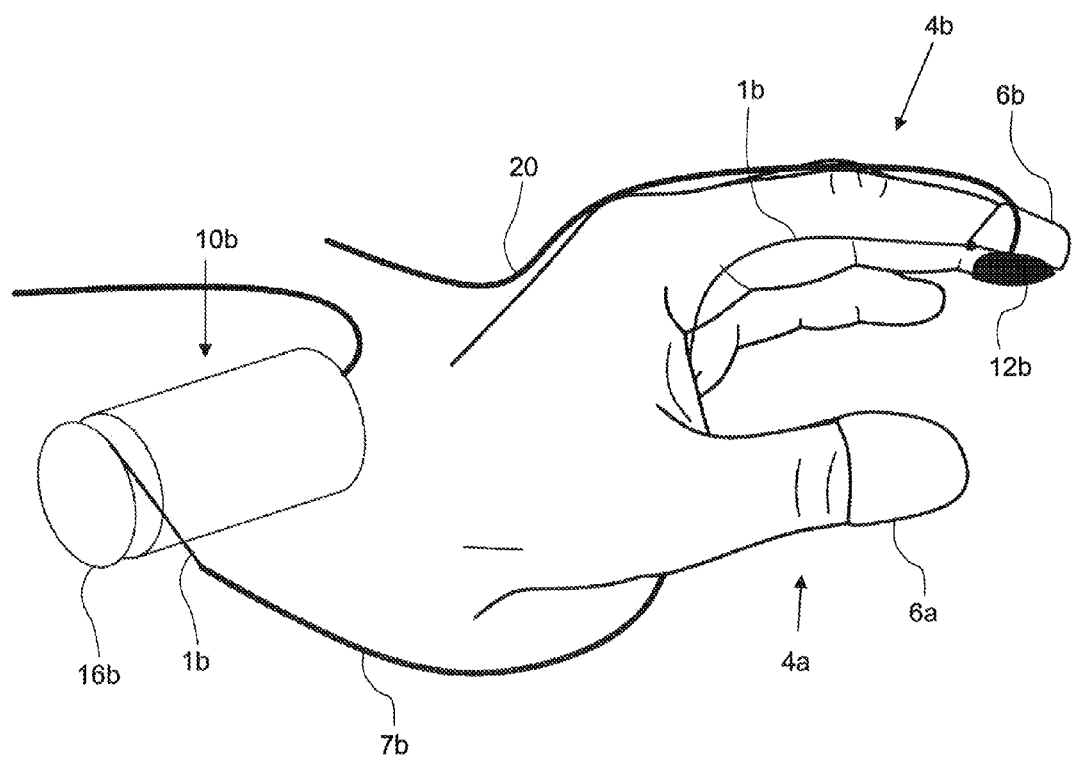
FIG. 3 is a perspective view of a hand provided with the glove intended to strengthen a gripping movement, with the actual glove material omitted and with a schematically illustrated actuator based on signals from a depicted sensor.

Batteries 18 provide the actuators $10a$-$10c$ and the electronic circuit 13 with energy. Said components, electronic circuit 13, processor 14, potentiometer 15, are preferably enclosed in a purpose-made box, here referred to as the control unit 19 and situated with advantage on the forearm, in which case the artificial tendons can with advantage be arranged to be concealed between the glove and the control unit 19. FIGS. 1 and 2 do not show the line which carries signals from the force detecting sensor $12a$-$12c$ to the control unit, in FIG. 3, said line is depicted as ref. 20.

Where the yoke 6 takes the form of a bonnet or socket, the tendons may am round the whole yoke 8, thus rendering fastening points irrelevant and resulting in the forces being better distributed and possibly allowing sideways movement of the finger.

The following are a number of further embodiment variants:

The ducts $3a$-$3c$ are made of such material that they can be allowed to run continuously all the way along the glove fingers, which means that they may also have a bellows like structure so that certain sections can change length, in this fatter case, the ducts may also be allowed to run all the way from the guides $2a$-$2c$ on the palm support 5 to the yokes 6 on the respective fingers.

The ducts $3a$-$3c$ may be sewn into the glove.

Strengthening may be provided for at least one finger in the glove. If for example the thumb of the natural hand is fixed, e.g. by being encased in plaster, a sufficiently good aid to being able to execute gripping movements during a rehabilitation period takes the form of a glove which only provides strengthening for the index finger's muscles.

To reduce friction between the tendons $1a$-$1c$ and the palm support 5, the mountings $9a$-$9c$ may be replaced by e.g. bail or rolling bearings.

All of or any desired pair of the artificial tendons, e.g. $1b$ for the index finger, may be replaced by such a tendon which is split at the support 5 into two portions which proceed further as in the examples previously referred to.

The actuators 10 may be situated in the actual palm.

In an embodiment when the control of the movements of the glove is made with a microcontroller unit an interface to the user can be enhanced by use of a display. Further the microcontroller can be connected to an external computer to make it easier to manipulate control settings. The connection can also be used for retrieving logs of usage. The logs can for example be sensor readings or statistics of usage from longer periods of time.

DEFINITIONS

Finger means all of the hand's fingers, including the thumb.

A finger is defined here as having four sides, the upper side of a finger being that which, when the hand is extended with the back side up, has a direction similar to the upper side (the back) of the hand, the inner side being the side of the finger which can be bent in towards the palm, and the lateral sides referred to simply as the finger's sides.

The invention claimed is:

1. A system for strengthening a gripping movement performed with at least one finger of a human hand enclosed in a glove, the system comprising:
a glove comprising
glove fingers,
a palm,
artificial tendons for at least one glove finger, the artificial tendons extending along an inside of the glove,
ducts fixed to the sides of the at least one glove finger, the artificial tendons running through the ducts, and
wherein the artificial tendons surround the tip of a finger enclosed in the at least one glove finger, and
wherein the ducts are arranged such that the artificial tendons extend at a distance from axes of joints of a finger enclosed in the at least one glove finger, wherein the distance of the artificial tendons from the axes of the joints increases as distance to the palm decreases,
whereby a pulling force exerted on the artificial tendons of the at least one glove finger bends the finger enclosed in the at least one glove finger inwards towards the palm;
a force detecting sensor situated on the inside of the glove finger arranged to detect a force between a finger enclosed in the glove finger and a contact surface applied to said finger,
the artificial tendons for a glove finger being connected to at least one actuator, and a control unit arranged to cause said at least one actuator to exert a pulling force on the artificial tendons of said at least one glove finger on the basis of a force detected by the force detecting sensor, whereby a finger enclosed in said at least one glove finger is caused to bend, as the enclosed finger balances pushing forces which occur along the finger from the pulling force in said artificial tendons.

2. The system according to claim 1, wherein the control unit is adapted to cause an actuator to exert a pulling force on the artificial tendons of at least one glove finger.

3. The system according to claim 1, wherein the control unit is adapted to cause at least one actuator to exert a pulling force on the artificial tendons of only one glove finger.

4. The system according to claim 1, wherein the control unit is adapted to cause an actuator to exert a pulling force on only the artificial tendons connected to the glove finger on the inside of which the force detecting sensor which detects said force is situated.

5. The system according to claim 1, wherein said force detecting sensor, said actuator and the control unit are comprised in a feedback loop, whereby the control unit comprises an electronic circuit comprising a processor programmed with a transmission function.

6. The system according to claim 1, wherein said force detecting sensor measures the whole or part of the force which occurs between said finger and said contact surface.

7. The system according to claim 5, wherein the detected force is scaled by a scale factor in the transmission function and is converted to a reference force for said controlled actuator.

8. The system according to claim 7, further comprising:
a variator connected to the electronic circuit, wherein the variator is used for setting the scale factor.

9. The system according to claim 5, wherein the transmission function controls the setting of pulling force to the respective glove finger via the actuator.

10. The system according to claim 1, wherein an actuator comprises an electric motor connected to a winding or linear device for the artificial tendons.

* * * * *